(12) United States Patent
Studnicka (10) Patent No.: US 10,657,343 B1
(45) Date of Patent: May 19, 2020

(54) LOCATION-BASED EMBEDDED PATTERNS FOR VEHICLE DETECTION AND DATA PROCESSING

(71) Applicant: PAYPAL, INC., San Jose, CA (US)

(72) Inventor: Todd Studnicka, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/215,466

(22) Filed: Dec. 10, 2018

(51) Int. Cl.
*G06K 7/10* (2006.01)
*G06K 15/00* (2006.01)
*G06K 7/14* (2006.01)
*G06Q 20/40* (2012.01)
*G06Q 20/14* (2012.01)
*H04N 5/232* (2006.01)
*G06K 9/00* (2006.01)

(52) U.S. Cl.
CPC ........... *G06K 7/1413* (2013.01); *G06Q 20/14* (2013.01); *G06Q 20/40* (2013.01); *G06K 9/00791* (2013.01); *H04N 5/23229* (2013.01)

(58) Field of Classification Search
USPC ....................................... 235/462.01, 462.13
See application file for complete search history.

(56) References Cited

U.S. PATENT DOCUMENTS

| | | | |
|---|---|---|---|
| 8,348,154 B2 * | 1/2013 | Sims | G06Q 20/12 235/380 |
| 9,633,243 B1 * | 4/2017 | Geist | G06K 7/10366 |
| 10,504,094 B1 * | 12/2019 | Gaudin | G06Q 20/204 |
| 2011/0307375 A1 * | 12/2011 | Maney | B60R 25/00 705/39 |
| 2016/0063459 A1 * | 3/2016 | Li | G06Q 20/10 705/39 |
| 2016/0189146 A1 * | 6/2016 | Cattone | G06Q 20/3829 705/71 |
| 2017/0237944 A1 * | 8/2017 | Haas | G07F 15/005 348/143 |
| 2019/0050634 A1 * | 2/2019 | Nerayoff | H04N 7/181 |

* cited by examiner

*Primary Examiner* — Tuyen K Vo
(74) *Attorney, Agent, or Firm* — Haynes and Boone, LLP (57) ABSTRACT

There are provided systems and methods for location-based embedded patterns for vehicle detection and data processing. A user's device, which may be connected to or associated with a vehicle may include a directional camera capable of capturing images in a direction for a directional perspective of the vehicle, such as a front, side, or back. The image captured may have an embedded pattern or code that is associated with data that may decoded or retrievable using the embedded pattern. The vehicle's device may utilize the code to determine the data and may activate a process for an application based on the data. In some embodiments, the data may also be loaded to the process or may cause the process to load or retrieve other data. The vehicle's device may utilize the process based on a location of the vehicle, as well as services provided at the location.

20 Claims, 5 Drawing Sheets

LOCATION-BASED EMBEDDED PATTERNS FOR VEHICLE DETECTION AND DATA PROCESSING

TECHNICAL FIELD

The present application generally relates to actions performed through a vehicle and more particularly to actions performed based on the vehicle detecting and location-based embedded patterns.

BACKGROUND

When operating vehicles, operators may wish to utilize onboard computing devices in order to expand capabilities of the vehicle, such as to conduct transaction or perform actions. However, such use may introduce hazards to the driver of the vehicle by diverting their attention, and may require multiple inputs to access an application, execute a process, and load or input data for that process. Use of the device may also be illegal, and therefore a driver may be prevented from activating and providing input to the device. As a result, a user of a vehicle maybe limited to what can be done using the vehicle due to vehicle limitations or the user may use a mobile device, such as a smart phone, to conduct transactions while operating the vehicle, resulting in risks to both the user and others. Thus, a need exists to enhance or expand capabilities of a vehicle.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for vehicle detection of location-based embedded patterns to enable data processing. Systems suitable for practicing methods of the present disclosure are also provided.

A vehicle's device may include capabilities to image or otherwise capture embedded patterns within objects, decode the patterns, and cause the device to perform some operation, which may include electronic transaction processing, messaging, and other types of data loading and processing. The application data loading processing may then be performed without or with minimal user interaction and input so as to prevent dangerous and/or illegal use of devices during operation of a vehicle or otherwise distract the user from operating the vehicle. Moreover, the vehicle's device may be automatically triggered to capture the image based on various available data, locations, and/or other detected data (e.g., vibrations caused by physical patterns within pavement or another road surface). Therefore, the user does not need to divert their attention to activate a device and/or execute applications and processes, and thus the vehicle's device may prevent diversion of the user's attention during use. In some embodiments, the vehicle's device may correspond to a stand-alone device, such as a console computing device, or may correspond to multiple devices, such as a vehicle dashboard camera and/or console computing device connected to another device, such as a mobile phone that may provide application functionality and data processing. The vehicle's device may be built into the vehicle or maybe attachable to the vehicle, such as through an on-board computing system of the vehicle.

The vehicle's device may include a camera that may capture images at a location, which may include optical, infrared, ultraviolet, or other types of radiation sensing component. The vehicle and/or vehicle's device may also include one or more vibrational sensors, accelerometers, gyroscopes, or other sensors, which may be capable of detecting physical patterns embedded within and/or created using a road surface, such as bumps or grooves in pavement, raised pavement markers, speed bumps, or other type of physical markers on a road surface. In this regard, an embedded pattern may correspond to an optical pattern that may be captured from an image using the camera. The embedded image may be readily apparent, such as paint, decals, icons, graphics, or other visual items. However, the embedded code may be made more discreet based on texturing or grading of other physical objects, such as road surfaces, walls, nearby physical objects (e.g., signs, pillars, portions of buildings, etc.). The embedded pattern may also correspond to data that may be detected using other types of imaging, such as heating/cooling elements that may output a pattern or code detected through infrared imaging. In some embodiments, the embedded pattern may be static, which may always be the same and correspond to a static embedded code or data. However, in other embodiments, the embedded pattern may be dynamic and may change over time or based on different input data. For example, a video monitor or projector may change the pattern to have another embedded code or data, or a heating/cooling element may dynamically adjust an output pattern that may be captured using infrared imaging.

The vehicle's device may further include additional components that may capture information about the embedded pattern in the object, such as a GPS locator or other location detection component that may determine a geo-location of the device and/or a route traveled by the device. The device may also include a compass functionality or other application or instrument for navigation. Additionally, the device may include a microphone and audio recording process, as well as an audio processing feature to process voice input, such as a voice-to-text process. The vehicle's device may also include a transceiver that may allow for wireless communications with one or more other devices or servers, including over cellular communications (e.g., 3G, 4G, 4G Long Term Evolution (LTE), 5G, other 3$^{rd}$ Generation Partnership Project (3GPP)-based cellular communications), or other types of wireless communications. In various embodiments, a self-driving vehicle may also capture an embedded pattern. Self-driving vehicles may be equipped with various sensors, including cameras and other optical detection and recognition components, distance sensors, speedometers or other acceleration/velocity detection components, and other sensors that may assist in operating a vehicle without or with minimal interaction by a user. These components may also be used to detect patterns embedded in objects. Using this information, the self-driving vehicle may utilize wireless communications and/or vehicle sensors to determine additional data for application processing.

In order to provide detection and capturing of embedded patterns in physical objects in proximity or nearby a vehicle for data determination and processing, the vehicle's device may first determine a direction of capture of the image/data and a timing (e.g., when to activate the camera and capture images or otherwise sense data using a sensor of the vehicle/device). This may be done based on user input to capture an image of a particular object, road surface, etc. (e.g., through user input, voice command, etc.), or may be done automatically based on detection of a condition of operation of the vehicle. For example, the vehicle's device may detect grading or patterns in the pavement, which may activate the device's camera for capture of an object (including the direction for capture). In other embodiments, the camera of the device may continually operate during operation of the vehicle to capture images and/or video, such as a dashboard camera or other camera mounted on or within a vehicle and used during operation of the vehicle. The vehicle's device may also detect a location or receive a wireless signal that activates the camera and causes capture of an image having the embedded pattern.

After capturing the image of the embedded pattern, the vehicle's device may then determine the data associated with the embedded pattern. In some embodiments, the embedded pattern may correspond to an embedded code, where decoding the embedded code by the device may determine the data. In some embodiments, the vehicle's device may previously download or retrieve a library used for decoding and/or data determination of the embedded pattern (or may actively retrieve at the time of data capture of the embedded pattern), which may include the data and/or be used to determine the data (e.g., through imaging matching, etc.). The library may be stored on the device or available with a service provider. However, in other embodiments, the embedded pattern may be used to request data from another device or server, such as a merchant device or service provider server. The image or information determined from the image may be transmitted to the other device/server for decoding and/or database querying/matching in order to receive the data associated with the embedded pattern.

In some embodiments, the vehicle's device and/or the other device/server may require additional data to determine the specific data associated with the embedded pattern. For example, the embedded pattern may be reused at multiple locations, so determination of the data may require a geo-location of the vehicle's device to determine the specific data for the pattern at that location (e.g., a restaurant number, merchant device identifier, etc.). The geo-location may be matched to a geo-fenced area specifically for the pattern, and therefore be used to determine the data for the pattern within that geo-fenced location. Thus, when a pattern or code is detected in an image, a geo-location may be determined by the device, and a database may be referenced in order to determine the specific data associated with the pattern and the geo-location of the pattern. The geo-location may be detected within a geo-fence associated with the pattern, or may be with a certain proximity range of the pattern to look up the correct data associated with the pattern in the database. Thus, a reference database may be used to determine what the pattern's associated data is based on the geo-location.

In certain embodiments, environmental factors may affect imaging and/or capture of the embedded pattern. For example, rain, snow, or other condition may affect visibility of a pattern and may adjust what the specific portions of the pattern may appear as while under those conditions. Thermal patterns may also be affected due to temperature. Thus, the vehicle's device and/or the other-device/server may determine the environmental conditions and may adjust image processing based on those conditions. Therefore, the vehicle's device may determine additional information when capturing data of the embedded pattern. For example, an image of the embedded pattern may be captured, a location of the vehicle's device may be determined, an orientation of the device may be determined (e.g., using a compass, accelerometer, and/or gyroscope), environmental data may be determined/recorded, and/or voice input by the user in the vehicle may be recorded. Such data may be processed to determine the specific pattern for capture and associated application data processing.

Once the data from the embedded pattern has been determined, the data may cause one or more actions with or on the device. For example, the data may be used to determine an item, or more generally any service, provided at a location associated with the embedded pattern. The data may be loaded to an application and/or application process, for example, by causing the application to load and/or execute a process and by automatically loading or inserting data into one or more data processing flows within the application. In some embodiments, this may include loading of a messaging identifier, device identifier, transaction data, location, code or other information used for data processing at the location, or other information. For example, the data may be used for communication with a device/server, and/or to associate the vehicle and vehicle device with a location/embedded pattern for data exchanges with the other device/server. The data may therefore be used for messaging and data exchange/processing with another device/server, which may be performed automatically using the data determined from the embedded pattern.

In some embodiments, the data may be application specific for an application provided by a service provider. For example, the data may be used to assist in electronic transaction processing provided by an online service provider for a transaction provided by the service at the location (e.g., drive-through purchasing, parking, toll road, car wash, etc., type service associated with vehicle use). For example, one or more embedded patterns may be used to pay for a transaction, where the transaction data may be static or one or more items/services may be selected from a static list, such as parking, driving tolls, car wash, etc. The embedded pattern(s) may be placed in a lane of traffic or on a sign/wall nearby a station to pay for the service. As a vehicle approaches the embedded pattern, the vehicle's device may capture the embedded pattern, determine transaction data for the item/service(s) provided at the location of the embedded pattern, and load transaction processing data to an electronic transaction processing and payment application. In this regard, an embedded code may be used to pay for tolls, parking, and other vehicle services. The application may be linked to a payment instrument, including a digital account with an online service/payment provider, which may be used to process the transaction. The transaction may be automatically processed in the application, or the application may allow the user to confirm payment and processing (e.g., using voice commands, keyboard/touch inputs, etc.). However, as all the transaction data is automatically loaded to the application, the number of required user inputs, data searches, and data processing may be minimized to prevent unsafe/illegal use and improve device use speed and convenience.

The embedded pattern may also be used to associate a vehicle/device with a more complex transaction, load data for electronic transaction processing without requiring user input/selections of items/services, merchant identification, payment instruments, and other transaction information, and process a payment to a merchant at the location using an online service provider. For example, a payment service provider and/or merchant may provide at least one embedded pattern in a drive-through so that the vehicle's device may load transaction data for the transaction at the location. Where one embedded pattern is used, the pattern may be placed near an ordering or checkout window/station, and the vehicle's device may determine the merchant/merchant services using the pattern. The vehicle's device may then load transaction data for a transaction established by the user in the vehicle from a merchant device, where the transaction data may be matched to the vehicle based on a time of the transaction and capture of the embedded pattern, location of the pattern and/or geo-location of the vehicle, etc. In some embodiments, this may require that the service provider communicate with the merchant's device that inputs the user's selection(s) of item/service(s) over a network, retrieve the transaction data, and communicate the transaction data to the vehicle's device for viewing and confirmation by the user in the vehicle. Thus, in some embodiments, the pattern may include or be associated with a merchant identifier, where the merchant identifier may be used to determine the merchant and merchant device (e.g., directly through encoded data or through a reference database query), and the service provider may communicate with the merchant device. The vehicle's device may then be used to process the transaction using a payment instrument (e.g., a digital account) and the service provider, and the vehicle's device may receive a transaction processing result or history. The service provider may transmit the result to the merchant device for authorization by the merchant and release/provision of the item/service(s), or the vehicle's device may output and/or transmit the result to the merchant's device (e.g., over a network or using short range wireless communications). The previously ascertained merchant identifier may be utilized to determine the merchant device and communicate with the merchant device to transmission of a transaction history, payment authorization, and/or release request of the corresponding item/service(s).

The merchant location may also provide multiple embedded patterns used in a drive-through to associate a vehicle with a transaction and load transaction data for a transaction at the merchant location to an application on the vehicle's device. For example, a first embedded pattern may be placed at an ordering window/station in a drive-through, and a vehicle at the ordering window may capture the embedded pattern to determine a merchant name, location, and other information. This information may be relayed to a transaction processing and payment application on the vehicle's device (or another device, such as a mobile phone). A service provider may then associate the vehicle and the vehicle's device with a transaction generated at the ordering window. This may be done through communications with a merchant device that generates the transaction. A second embedded pattern may be placed at a checkout and payment window/station, where the second embedded pattern may be used to recall the transaction and/or load the transaction data for processing a payment to the merchant. Thus, as the vehicle approaches and is at the checkout area of the merchant location, the vehicle's device may capture the embedded pattern and load transaction data for processing and/or payment. The user in the vehicle may then automatically view the transaction and confirm the transaction, as discussed herein.

In various embodiments, the embedded pattern may change over time based on wear, weather conditions, etc. As such, when the vehicle's device captures an image of the embedded pattern, the vehicle's device may upload the image to the service provider. The service provider may use the uploaded image to update the stored image or data of the embedded pattern, thereby keeping the embedded pattern current so that other devices capturing the image may properly determine the data associated with a pattern. The updating may occur of the data library for embedded patterns and their associated data. The device may also update a stored data library on the device based on the newly captured image so that the image is current and may be used for image processing, recognition, and/or matching. Thus, the processes described herein may be used to automate device usage during vehicle operation, reduce the number of required inputs to load and process application data, and speed up data processing on a device, which provides increased safety and legality of device usage during the vehicle operation.

Figure 1:
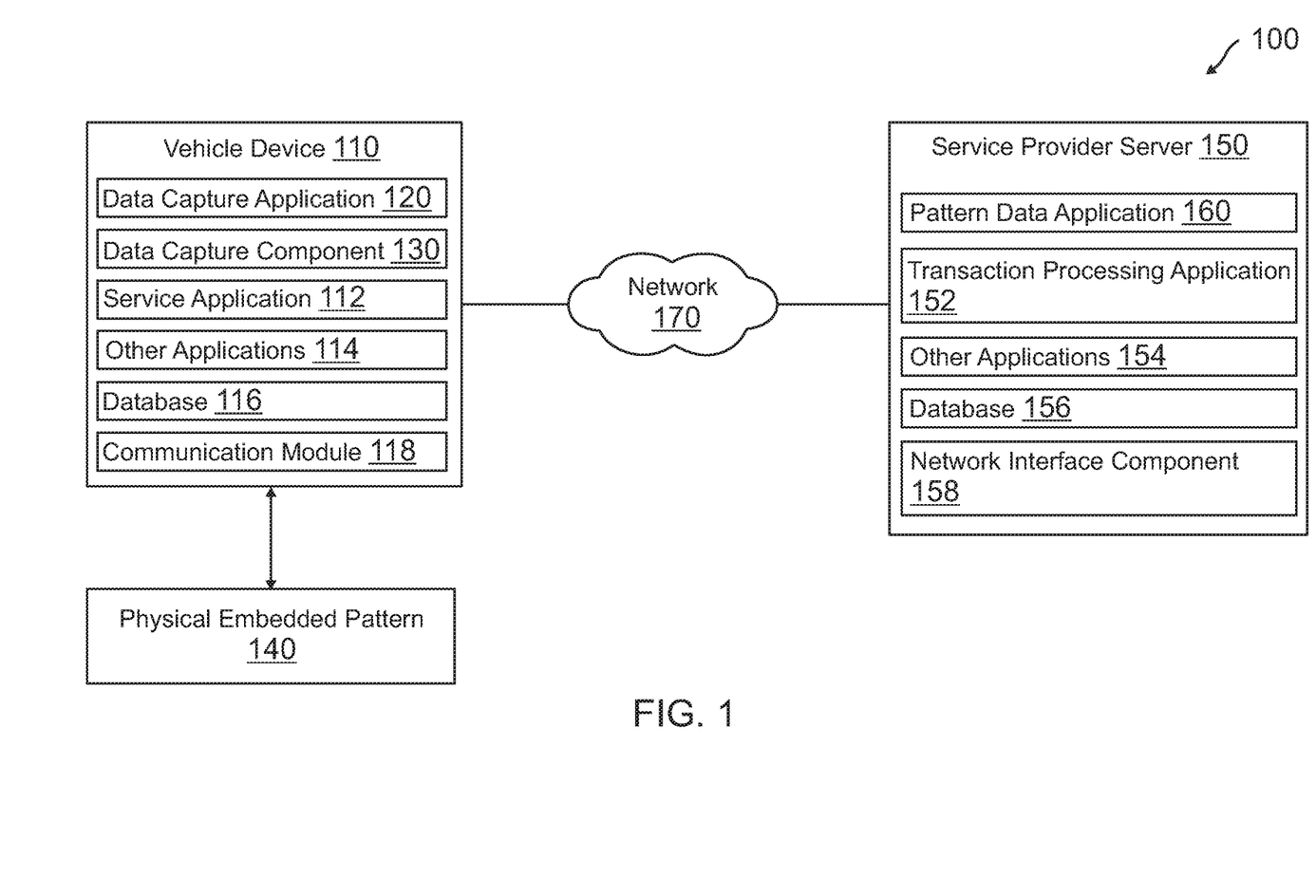
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a vehicle device 110, a physical embedded pattern 140, and a service provider server 150 in communication over a network 170. Vehicle device 110 may be utilized by a user to capture data of physical embedded pattern 140, and determine data associated with physical embedded pattern 140, such as a location and item/service provided at the location. Vehicle device 110 may then use the information to load an application process and/or data used for processing with the item/service at the location. Service provider server 150 may provide information necessary to determine the data by vehicle device 110 from physical embedded pattern 140. Additionally, service provider server 150 may also be used for communication services, transaction processing, and message processing.

Vehicle device 110 and service provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Vehicle device 110 may be implemented as a communication device that may utilize appropriate hardware and software configured for wired and/or wireless communication with service provider server 150. For example, in one embodiment, vehicle device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Vehicle device 110 may also include or correspond to a device for a vehicle, including a self-driving vehicle operational system, a vehicle console device, a computing system managing a heads-up-display for a vehicle, or other device connected to or included with a vehicle, including road vehicles and aerial vehicles. Although only one device is shown, a plurality of user and/or vehicle devices may function similarly and/or be connected to provide the functionalities described herein.

Vehicle device 110 of FIG. 1 contains a data capture application 120, data capture components 130, a service application 112, other applications 114, a database 116, and a communication module 118. Data capture application 120, service application 112, and other applications 114 may correspond to executable processes, procedures, and/or applications with associated hardware. In other embodiments, vehicle device 110 may include additional or different modules having specialized hardware and/or software as required.

Data capture application 120 may correspond to one or more processes to execute modules and associated software/hardware of vehicle device 110 to capture data, such as an image or other sensed data, of an embedded pattern in a real-world physical object, and further to determine data for processing by service application 112. In this regard, data capture application 120 may correspond to specialized software utilized by vehicle device 110 to first receive a trigger or request to capture at least one image of a scene, where the scene may be in proximity to vehicle device 110 and/or a vehicle associated with vehicle device 110 (e.g., where vehicle device 110 is inside, connected to, etc.). The trigger command may be based on sensed data, such as a location, vibration caused by demarcations in a surface when operating a vehicle, electronic signal or network communication, etc. The trigger command may also be based on user input, such as a touch, keyboard, mouse, or voice command. The trigger may also indicate a direction of imaging or data capture of the scene, which may cause vehicle device 110 to capture images in a direction. For example, a vehicle associated with vehicle device 110 may arrive at a location, where vehicle device 110 detects a geo-location of the vehicle. The geo-location may be used to determine a merchant at the location, such as through a reference database query/look up, or through entering a geo-fence of the merchant. In other embodiments, sensed vibrations in a pavement pattern may be used to activate the camera in a similar fashion using vibrational data in a database. Such data may be stored locally by vehicle device 110 and/or by service provider server 150. In response to the geo-location, vibrations, or other trigger, data capture components 130 may be activated by data capture application 120, and data of a scene may be captured, such as an image. The image may then be processed by data capture application 120, as discussed herein.

However, in other embodiments, data capture components 130 may include a fixed camera that captures data in a specific direction, or the camera may be aimed by a user. In some embodiments, other sensed data may also or instead be detected, such as vibrations, changes in surfacing, heat, or other data capable of being detected using data capture components 130. The data that is captured may include data of an embedded pattern in a scene, such as physical embedded pattern 140. After capture of physical embedded pattern 140 in the scene, data capture application 120 may be used to determine associated data with physical embedded pattern 140. In some embodiments, physical embedded pattern 140 may correspond to an embedded code, where the data may be directly decoded from the embedded code. However, in other embodiments, physical embedded pattern 140 may require image processing matching, and/or other data determination using a library of images, patterns, or other information to determine the associated data. The library may be stored locally on vehicle device 110 and/or retrievable from service provider server 150. Once the associated data is determined, data capture application 120 may execute a process with the data based on the content of the data. For example, an executable process within or associated with the data may open another application and/or execute a process in the application, as well as load data to the application. In some embodiments, the application may correspond to service application 112, which may process the data, such as location, merchant, and/or transaction data associated with the embedded pattern. Data capture application 120 may further be used to capture additional images or data of embedded patterns after a first embedded pattern, for example, to further determine a location of a vehicle and/or determine additional data necessary for service application 112.

Data capture components 130 correspond to a hardware and/or software feature of vehicle device 110 that assists in capturing data of physical embedded pattern 140, and determine additional data associated with or encoded to physical embedded pattern 140. In various embodiments, data capture components 130 may include a camera, which corresponds to an optical device of vehicle device 110 enabling vehicle device 110 to capture or record images, including still and/or video images. Data capture components 130 may correspond to a digital camera on vehicle device 110 (e.g., incorporated in vehicle device 110 such as a mobile phone's digital camera in a traditional camera orientation and/or a forward facing camera orientation that captures one or more users as they use and view a display screen of vehicle device 110) or associated with vehicle device 110 (e.g., connected to vehicle device 110 but not incorporated within a body or structure of vehicle device 110), or may more generally correspond to any device capable of capturing or recording an image, video, or other data conveying content, including infrared imaging or other types imaging devices. The captured image may be of physical embedded pattern 140. The camera of data capture components 130 may also correspond to an onboard camera of a vehicle, such as a fixed vehicle camera, dashboard camera, or other camera that is utilized with a vehicle. As a digital camera, data capture components 130 may include a sensor array disposed on a semiconductor substrate having a plurality of photosensitive elements configured to detect incoming light. In other embodiments, other types of electromagnetic radiation sensors may be used, including infrared sensitive sensors/elements and the like. A camera of data capture components 130 may include various features, such as zoom, flash, focus correction, shutter speed controls, or other various features usable to capture one or more images or videos of the user and/or other users or objects.

In certain embodiments, data capture components 130 may include a location detection component capable of detecting a location of vehicle device 110, for example, through a GPS locator and service, triangulation process, mapping application, check-in process/feature, wireless communications, or other location detection process. Data capture components 130 may be used to determine a location of vehicle device 110, which may be utilized to determine the associated data for physical embedded pattern 140. Moreover, the location for vehicle device 110 that may be determined by data capture components 130 may be shared with, provided to, or utilized by service provider server 150 when determining the data associated with physical embedded pattern 140. Data capture components 130 may include other media capture components, including a microphone to capture audio data. A microphone of data capture components 130 may be used to capture voice data, which may be processed to determine when and/or where to image physical embedded pattern 140, as well as other data necessary for determining the data associated with physical embedded pattern 140. Data capture components 130 may further include a navigational component and/or application, such as a compass, as well as a gyroscope, accelerometer, or other component that may detect an orientation of vehicle device 110 and vibration of vehicle device 110 (or the vehicle associated with vehicle device 110) to capture physical embedded pattern 140.

Data capture components 130 may also include or be connected to components and sensors utilized with self-driving vehicles, such as cameras used to capture views around a vehicle and used to operate the vehicle, speed sensors, distance sensors, and other components. Data capture components 130 may include peripherals and/or attachable devices that may be connected through one or more ports or wired/wireless connections and used to capture data for determination of physical embedded pattern 140. For example, data capture components 130 may include or be associated with attachable dashboard cameras, speed detection components relative to vehicle device 110 and/or vehicle, distance sensors, and/or connectable mobile devices. Data capture components 130 may also include software components that may interact with the hardware components to facilitate data determination, such as camera controllers.

Service application 112 may correspond to one or more processes to execute software modules and associated devices of vehicle device 110 to provide various services to vehicle device 110, which may include processing electronic transactions over a network with one or more other services and/or users using data determined from data capture application 12Q. In this regard, service application 112 may correspond to specialized hardware and/or software utilized by a user of vehicle device 110 to receive the data from data capture application 120 after determining the data by capturing information for physical embedded pattern 140. After determination of the data, data capture application 120 may open or activate service application 112, execute a process within service application 112, and/or load data to the process within service application 112. In some embodiments, the data may correspond to a location, merchant identifier for a merchant associated with the location, device identifier for messaging and/or communications, and/or transactional data for a transaction with the merchant. In some embodiments, the process within service application 112 may access a platform provided by service provider server 150, and perform electronic transaction processing. Service application 112 may be utilized to transmit a transaction processing request to service provider server 150, which may include the transaction information determined using physical embedded pattern 140, as well as account information or another payment instrument. Service application 112 may also receive and/or provide transaction histories and/or results based on the transaction processing, which may be communicated to a merchant device at the location for authorization and/or confirmation of the transaction processing. In various embodiments, service application 112 may correspond to a general browser application configured to retrieve, present, and communicate information over the Internet (e.g., utilize resources on the World Wide Web) or a private network. However, in other embodiments, service application 112 may include a dedicated application of service provider server 150 or other entity (e.g., a merchant), which may be configured to assist in processing transactions electronically.

In various embodiments, vehicle device 110 includes other applications 114 as may be desired in particular embodiments to provide features to vehicle device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170, including messaging utilized by data capture application 120. Other applications 114 may also include other location detection applications, which may be used to determine a location for vehicle device 110, such as a mapping application. Other applications 114 may interface with data capture application 120 after determination of data from physical embedded pattern 140 in order to process the data. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use components of vehicle device 110, such as display components capable of displaying information to users and other output components, including speakers.

Vehicle device 110 may further include database 116 stored on a transitory and/or non-transitory memory of vehicle device 110, which may store various applications and data and be utilized during execution of various modules of vehicle device 110. Database 116 may include, for example, identifiers such as operating system registry entries, cookies associated with data capture application 120 and/or other applications 114, identifiers associated with hardware of vehicle device 110, or other appropriate identifiers, such as identifiers used for payment/user/device authentication or identification, which may be communicated as identifying the user/vehicle device 110 to service provider server 150. Moreover, database 116 may include stored data determined from physical embedded pattern 140, as well as a data library used to determine the data from physical embedding pattern 140.

Vehicle device 110 includes at least one communication module 118 adapted to communicate with service provider server 150 and/or another nearby device within range of communication module 118. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using wireless communications, such as Bluetooth Low Energy, LTE Direct, WiFi, radio frequency, infrared, Bluetooth, and near field communications.

Physical embedded pattern 140 may correspond to a pattern or code that is embedded into a physical object and capable of being captured using one or more sensors of vehicle device 110. In some embodiments, physical embedded pattern 140 may correspond to a graphic, image, icon, or other visual overlay on a physical object, or may correspond to an embedding within the object, such as raised or sunken portions of a surface (e.g., a road surface) that for a pattern. In some embodiments, physical embedded pattern 140 may be capable of being detected using a camera or other visual imaging device. However, in further embodiments, physical embedded pattern 140 may further include a pattern that is capable of being captured by other sensors, including thermal sensors, vibrational or tactile sensors, or other sensors that may be associated with a vehicle. Physical embedded pattern 140 may be associated with data, which may be retrievable by capturing data of physical embedded pattern 140 and performing matching or processing of the pattern to retrieve the associated data. However, in other embodiments, physical embedded pattern 140 may include an embedded code, where the associated data may be determined from decoding physical embedded pattern 140.

Service provider server 150 may be maintained, for example, by an online service provider, which may provide data determination for associated data with physical embedded pattern 140, as well as transaction processing services. In this regard, service provider server 150 includes one or more processing applications which may be configured to interact with vehicle device 110 and/or another device/server to facilitate communications and transactions between users based on data captured by one of the user. In one example, service provider server 150 may be provided by PAYPAL®, Inc. of San Jose, Calif., USA. However, in other embodiments, service provider server 150 may be maintained by or include another type of service provider, which may provide connection services to a plurality of users.

Service provider server 150 of FIG. 1 includes a pattern data application 160, a transaction processing application 152, other applications 154, a database 156, and a network interface component 158. Pattern data application 160, transaction processing application 152, and other applications 154 may correspond to executable processes, procedures, and/or applications with associated hardware. In other embodiments, service provider server 150 may include additional or different modules having specialized hardware and/or software as required.

Pattern data application 160 may correspond to one or more processes to execute modules and associated specialized hardware of service provider server 150 to provide associations between embedded patterns and stored data for use in implementing an application process and/or loading application data to the process for data processing within another device/server. In this regard, pattern data application 160 may correspond to specialized hardware and/or software to first receive an indication that physical embedded pattern 140 has been or will be implemented at a location, such as a merchant location and within a physical object. In other embodiments, pattern data application 160 may receive a request for a pattern, and then may provide physical embedded pattern 140 (or a digital representation of physical embedded pattern 140 for implementation in a physical object) to the entity requesting the pattern.

Once physical embedded pattern 140 has been registered, additional data and information may be associated with physical embedded pattern 140 using pattern data application 160. For example, a location and/or an item/service available at the location may be registered so that an application process may determine and load data for the location, a transaction for the item/service, and/or a device/server for electronic transaction process of the transaction. In other embodiments, additional or other application data may be associated with physical embedded pattern 140, which may cause an application to open, execute a process, and/or load the data. In response imaging or other data capture of physical embedded pattern 140, pattern data application 160 may receive a request for the data associated with physical embedded pattern 140, which may include the captured data. Pattern data application 160 may utilize image processing, data matching, or other processes to perform a lookup of the associated data with physical embedded pattern 140, and may then transmit the data to vehicle device 110. In other embodiments, physical embedded pattern 140 may provide a data library to vehicle device 110 for lookup and determination of the associated data with physical embedded pattern 140 without requiring the data captured of physical embedded pattern 140 to be transmitted to pattern data application 160. In some embodiments, pattern data application 160 may interface with transaction processing application 152 to receive transaction data from a merchant device and provide the transaction data to service application 112 after data of physical embedded pattern 140 is captured by vehicle device 110.

Transaction processing application 152 may correspond to one or more processes to execute modules and associated specialized hardware of service provider server 150 to process a transaction through service application 112, where the transaction may include transaction data received by capturing data of physical embedded pattern 140. In this regard, transaction processing application 152 may correspond to specialized hardware and/or software used by a user associated with vehicle device 110 to establish a payment account with transaction processing application 152 by providing personal and/or financial information to service provider server 150 and selecting authentication credentials. In various embodiments, the financial information may include payment instrument information, such as account/card numbers and information. The account may be used to send and receive payments. The payment account may be accessed and/or used through a browser application and/or dedicated payment application executed by vehicle device 110, such as service application 112.

In some embodiments, a merchant device at a location associated with physical embedded pattern 140 may generate transaction data, and may communicate with transaction processing application 152 to provide the transaction data to vehicle device 110 when physical embedded pattern 140 is captured by vehicle device 110 and the device is determined to be located at an ordering and/or checkout location within the merchant location. Where multiple physical embedded patterns are utilized, capturing data of a second physical embedded pattern may cause transaction processing application 152, with pattern data application 160, to transmit the transaction data to vehicle device 110 in response to capturing of the data of physical embedded pattern 140. In other embodiments, the transaction may be static for all users (e.g., parking, tolls, etc.), and pattern data application 160 may provide the transaction data for processing without requiring a merchant device to generate the transaction data. Transaction processing application 152 may receive a payment request from vehicle device 110 for the transaction data by the account, which may include identifiers, tokens, or other data used for transaction processing. Transaction processing application 152 may process a payment, and may provide a transaction history to vehicle device 110 and/or a merchant device for transaction authorization, approval, or denial.

In various embodiments, service provider server 150 includes other applications 154 as may be desired in particular embodiments to provide features to service provider server 150. For example, other applications 154 may include security applications for implementing server-side security features, programmatic client applications for interfacing with appropriate application programming interfaces (APIs) over network 170, or other types of applications. Other applications 154 may contain software programs, executable by a processor, including a graphical user interface (GUI), configured to provide an interface to the user when accessing service provider server 150, where the user or other users may interact with the GUI to more easily view and communicate information. In various embodiments, other applications 154 may include additional connection and/or communication applications, which may be utilized to communicate information to over network 170.

Additionally, service provider server 150 includes database 156. Database 156 may store various identifiers associated with vehicle device 110. Database 156 may also store account data, including payment instruments and authentication credentials, as well as transaction processing histories and data for processed transactions. Database 156 may store received data associated with physical embedded pattern 140, which may be provided to vehicle device 110 after capturing data of physical embedded pattern 140. In some embodiments, a data library may be accessible and/or available for download from database 156. Additionally, database 156 may store transaction data received from a merchant device and provided to vehicle device 110.

In various embodiments, service provider server 150 includes at least one network interface component 158 adapted to communicate vehicle device 110 and/or another device/server for a merchant over network 170. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2A:
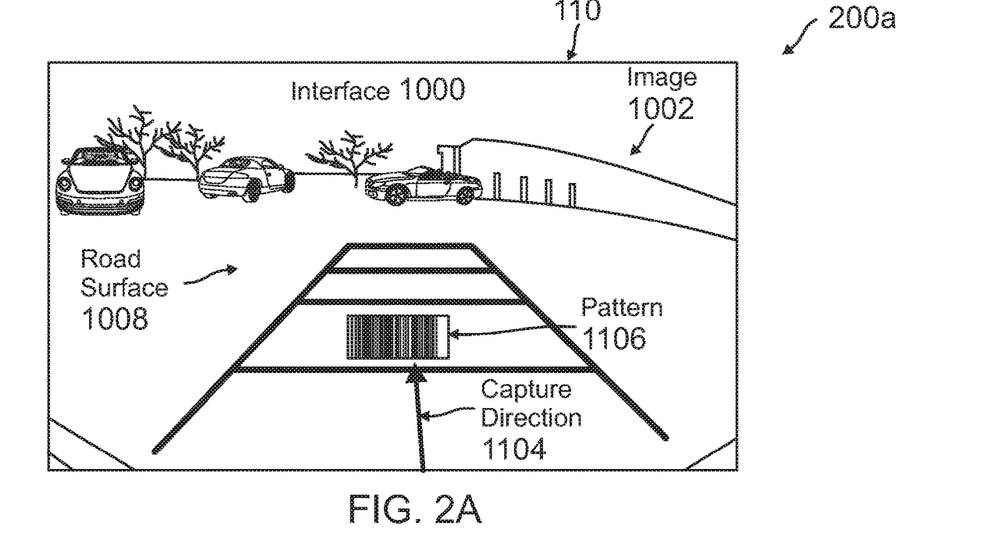
FIG. 2A is an exemplary real-world environment where a vehicle captures an embedded pattern during use to automate loading and/or processing of data in an application, according to an embodiment.

FIG. 2A is an exemplary real-world environment where a vehicle captures an embedded pattern during use to automate loading and/or processing of data in an application, according to an embodiment. Environment 200a of FIG. 2A includes vehicle device 110 discussed in reference to system 100 of FIG. 1. In this regard, vehicle device 110 displays an interface 1000 of a camera of vehicle device 110 used to capture an image 1002 in a capture direction 1004 of a pattern 1006, where pattern 1006 is shown as embedded in or overlaid onto a road surface 1008 so that vehicle device 110 may receive location-specific data for the location.

As a vehicle associated with vehicle device 110 travels through a location, a trigger may cause vehicle device 110 to capture image 1002 in interface 1000. In other embodiments, vehicle device 110 may continuously be recording data, and may detect pattern 1006 during use of the vehicle, such as an onboard vehicle camera that continuously captures images while operating the vehicle. Vehicle device 110 may capture data in a capture direction 1004 of road surface 1008, such that image 1002 includes data of pattern 1006. Once captured, pattern 1006 may be decoded, or may be processed using other available data of pattern 1006 (e.g., lookup tables in a database, imaging processing data, etc.). This may allow vehicle device 110 to determine data associated with pattern 1006 for processing using an application and application process of vehicle device 110. In other embodiments, pattern 1006 may instead correspond to a pattern of raised and/or indented material in road surface 1008 that may be detected by other sensors, such as vibrational sensors of a vehicle.

Pattern 1006 may be implemented at the location to allow for vehicle device 110 to determine data for the location that is associated with pattern 1006, such as encoded into pattern 1006 or available from a data library that may refer pattern 1006 to the data. For example, pattern 1006 may be captured in a drive-through of a merchant location, and may provide data for vehicle device 110 to determine the merchant location, transaction information available at the merchant location for vehicle device 110, and may associate vehicle device 110 with the transaction information based on a time of capture of image 1002 and a time of generation or other timestamp for the transaction data. In other embodiments, pattern 1006 may be associated with static transaction data used by all users at the location to pay for an item or service, such as a toll, parking cost, or other item/service that is static or may be selected from static choices (e.g., gas, electricity, or other vehicle fuel, car wash or other service, etc., which may be selected from a simplified menu having static choices). Once the transaction data is retrieved and loaded to a process of vehicle device 110, vehicle device 110 may process the transaction data at the location and purchase one or more items or services at the location without requiring extensive user inputs to perform location, merchant, and/or item/service lookup and transaction generation. Thus, the user may receive a simplified electronic transaction processing procedure that limits user inputs and automate data entry.

Figure 2B:
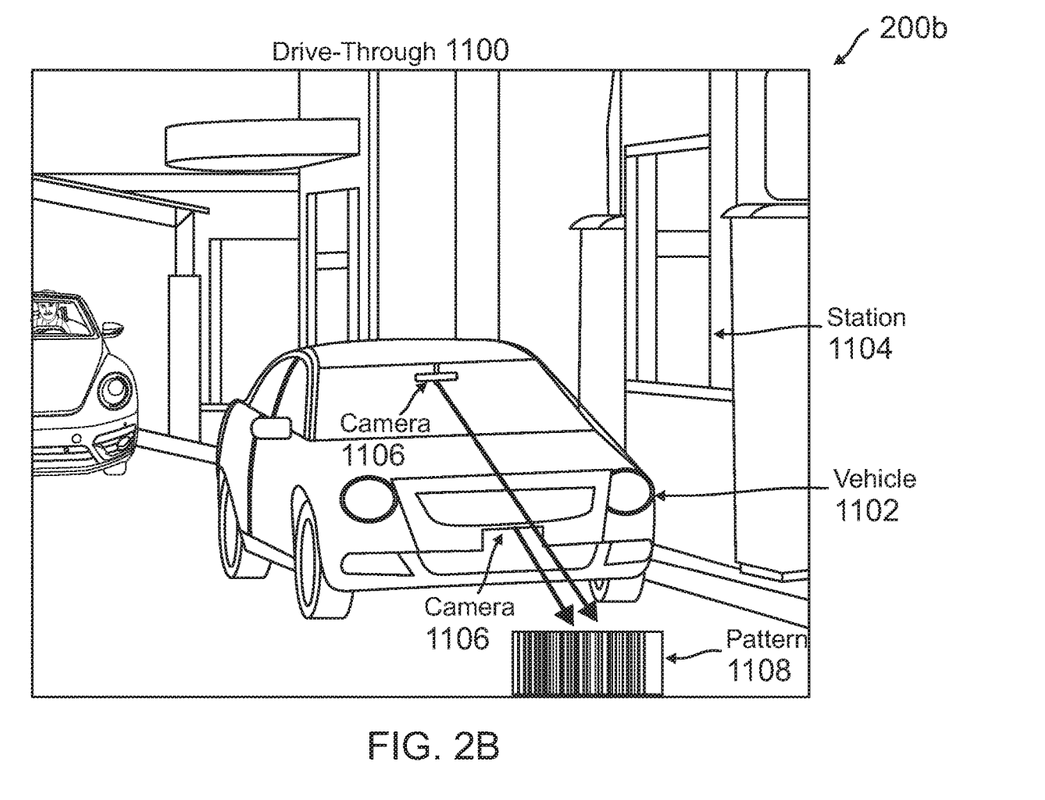
FIG. 2B is an exemplary real-world environment where a vehicle captures an embedded pattern in a drive-through for data processing, according to an embodiment.

FIG. 2B is an exemplary real-world environment where a vehicle captures an embedded pattern in a drive-through for data processing, according to an embodiment. Environment 200*b* of FIG. 2B includes a camera 1106 provided by a vehicle device, such as vehicle device 110 discussed in reference to system 100 of FIG. 1. In this regard, the vehicle device operates camera 1106 while vehicle 1102 is located in a drive-through 1100 to provide automated data entry for electronic transaction processing while at station 1104, such as a checkout station used to pay for items purchased from a drive-through service of a merchant restaurant location. Thus, camera 1106 may be used to image pattern 1108 to provide simplified data entry and electronic transaction processing using an application of the vehicle device.

When vehicle 1102 is located at station 1104, a transaction may be generated and/or recalled on a merchant device that requires a payment from the user within vehicle 1102. Camera 1106 of the user's vehicle device may capture pattern 1108 at station 1104 and may then associate vehicle 1102 and the user/vehicle device inside vehicle 1102 with the transaction currently pending at station 1104. In some embodiments, pattern 1108 may be static, and may be used to detect vehicle 1102 at station 1104 and thereby associate vehicle 1102 and the user in vehicle 1102 with the transaction that requires payment at station 1104. Thus, a service provider server or merchant server may then push transaction data to the vehicle device in vehicle 1102 for processing after capturing pattern 1108 (e.g., based on the detected location of vehicle 1102 when capturing pattern 1108). However, in other embodiments, pattern 1108 may be dynamic, and may therefore encode data for the transaction data to pattern 1108, which may be decoded and directly loaded to the application process for electronic transaction processing on the vehicle device. After loading of the data to the application of the vehicle device while at station 1104, the application may then process the data. Thus, the user is not required to enter input of the transaction data to the application and may have the data directly loaded to the application process using this automated procedure.

In some embodiments, camera 1106 of the vehicle device may be used to capture pattern 1108 after first capturing image 1002 in environment 200*a* of FIG. 2A. For example, environment 200*a* may occur prior to environment 200*b* in drive-through 1100, such as at an ordering station of drive-through 1100. Thus, image 1002 may be used to first associate vehicle 1102 and the vehicle device associated with vehicle 1102 with a transaction that is generated at the ordering station. Once associated, the vehicle may proceed to station 1104 in drive-through 1100, and the transaction data may be recalled on the vehicle device and/or merchant device based on vehicle 1102 capturing pattern 1108 using camera 1106. The transaction may then be processed as described herein.

Figure 2C:
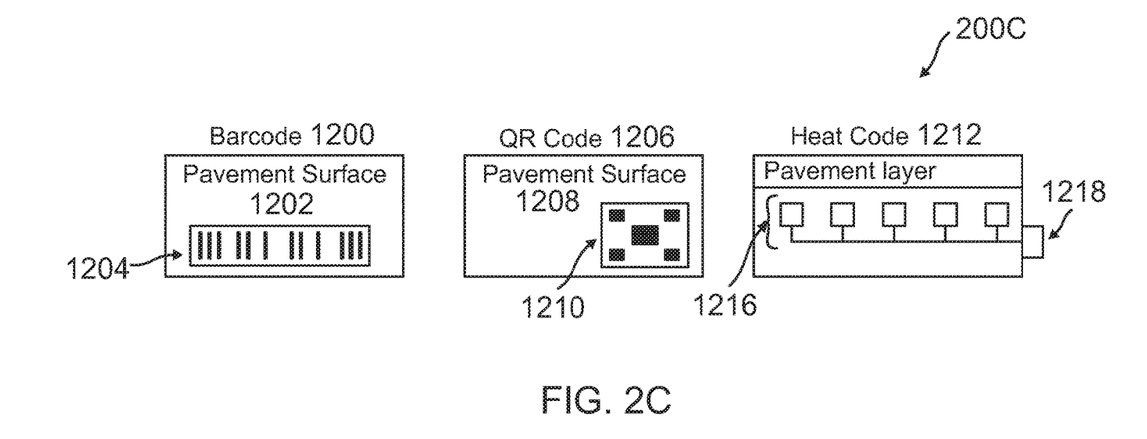
FIG. 2C are exemplary patterns and/or codes that may be embedded in a physical object for vehicle detection and processing, according to an embodiment.

FIG. 2C are exemplary patterns and/or codes that may be embedded in a physical object for vehicle detection and processing, according to an embodiment. Environment 200*c* includes different types of patterns or codes that may be embedded within or overlaid on a surface, such as a road surface, wall, or other surface, that may be captured by a camera associated with a vehicle during operation of the vehicle. Although three patterns are shown in environment 200*c*, other types of patterns and/or codes may also be embedded on or within a surface, including alphanumeric patterns or codes, images of scenes or objects, etc.

For example, environment 200*c* includes a barcode 1200, a quick response (QR) code 1206, and a heat code 1212, which may each provide a pattern that may embedded on or within an object and associated with data that may be retrieved by capturing data of the displayed patterns. For example, barcode 1200 includes a pavement surface that has a barcode pattern 1204 that is on or within pavement surface 1202. Barcode pattern 1204 may correspond to paint, a graphic, or other image that may be on pavement surface 1202, or may include raised and lowered lines within the actual material of pavement surface 1202. Thus, barcode 1200 may be captured using a camera, or may be detected by driving over barcode 1200 and detecting vibrations or other movements of a vehicle in response to barcode pattern 1204 being within pavement surface 1202 and causing the vehicle to move in response to barcode pattern 1204. Similarly, QR code 1206 includes a pavement surface having a QR code pattern 1210 embedded within or on pavement surface 1208. QR code 1206 may similar be imaged by a camera or captured by vibration detection sensors of a vehicle, and associated data with QR code 1206 may be determined.

Heat code 1212 may be included within or under pavement layer 1214 of a surface and may provide a code that may be detected using a thermal sensor. For example, heating elements 1216 may output different temperatures based on commands by a controller 1218 such at pavement layer 1214 has a code of higher and lower temperatures used to make a thermal code that may be detectable. Thus, heating elements 1216 may be below a road surface or within the surface and be capable of providing or creating heat in specific patterns that may be read using a thermal sensor. In some embodiments, controller 1218 may be linked to a merchant device and/or service provider server, which may adjust or control heating elements 1216 to provide different patterns for different users and/or communicate with a device dynamically, such as to update encoded information, relay new information, and/or change existing information. For example, an order total may be updated, or changes based on a change to an order, and heating elements 1216 may be encoded with changing information by controller 1218, or a refund may be issued through a change in the heat pattern. After completion of a transaction, controller 1218 may shut off or deactivate heating elements 1216 so that the pavement may be sufficiently cooled off before a next consumer at the merchant, thereby allowing controller 1218 to output new information through heating elements 1216 that may be read by a device. In some embodiments, controller 1218 and/or another device/server may determine there is insufficient time until requiring new encoded data, such as a next transaction, and may therefore add to an existing pattern to allow a new device to view a changed pattern and thereby properly determine data.

In some embodiments, barcode 1200, QR code 1206, and heat code 1212 may be associated with data that may be retrieved by imaging or otherwise capturing data of barcode 1200, QR code 1206, and heat code 1212, for example, using a local or remote data library that has data for lookup using barcode 1200, QR code 1206, and heat code 1212. As barcode 1200, QR code 1206, and heat code 1212 may include encoded data, barcode 1200, QR code 1206, and heat code 1212 may be decoded to determine the data for barcode 1200, QR code 1206, and heat code 1212. Moreover, in some embodiments, barcode 1200, QR code 1206, and heat code 1212 may be dynamic, for example if barcode 1200 or QR code 1206 is projected onto a surface using another device and visual project or is located within a display within a surface (e.g., a graphical user interface of a display device that displays barcode 1200 or QR code 1206), or if heat code 1212 is dynamically generated using controller 1218.

Figure 3:
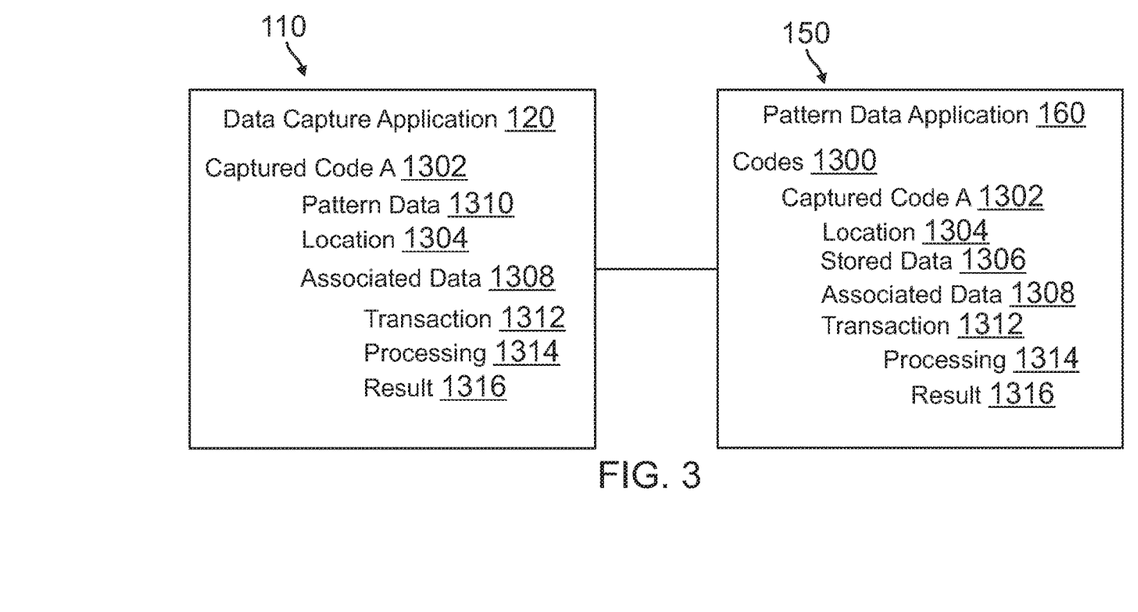
FIG. 3 is an exemplary system environment where a vehicle device and a service provider may interact to provide application data necessary for processing after capturing data of an embedded pattern at a location, according to an embodiment.

FIG. 3 is an exemplary system environment where a vehicle device and a service provider may interact to provide application data necessary for processing after capturing data of an embedded pattern at a location, according to an embodiment. System 300 of FIG. 3 includes vehicle device 110 and service provider server 150 discussed in reference to system 100 of FIG. 1.

In order to process codes captured by vehicle device 110, service provider server 150 may provide pattern data application 160 that performs the processes and procedures discussed in system 100. In this regard, pattern data application 160 includes data for codes 1300, such as a captured code A 1302 from vehicle device 110. In system 300, vehicle device 110 executes data capture application 120 to perform the processes and procedures discussed in system 100. Data capture application 120 is used to capture data of an embedded pattern, such as captured code A 1302. Captured code A 1302 may be stored by pattern data application 160 with additional data that may be retrieved by capturing data of captured code A 1302. For example, captured code A 1302 may be associated with a location 1304, stored data 1306, and associated data 1308 that may be processed by an application on vehicle device 110 after capturing data of captured code 1302.

Vehicle device 110 may therefore be used to capture data of captured code A 1302. Once data capture is performed, captured code A 1302 may be processed to determine pattern data 1310 that may correspond to encoded data necessary to determine associated data 1308. In some embodiments, pattern data 1310 may include encoded data, such as associated data 1308. In other embodiments, data capture application 120 may utilize pattern data 1310 with additional data, such as location 1304, to determine associated data 1308 using a data lookup process. In some embodiments, associated data 1308 may be used with an application process, such as an electronic transaction processing process. In such embodiments, a transaction 1312 may be generated, and may be processed through service provider server 150. Pattern data application 160 may request processing 1314 with another transaction processing application of service provider server 150, and may provide a result 1316 to vehicle device 110 and/or a merchant device for transaction authorization, approval, or denial.

Figure 4:
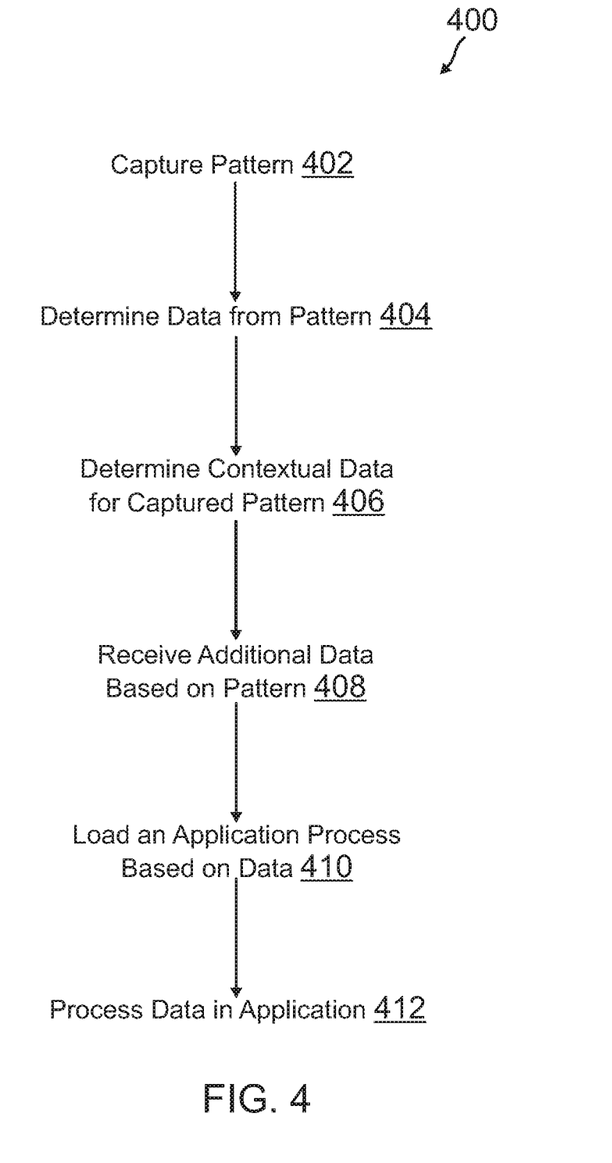
FIG. 4 is a flowchart of an exemplary process for embedded patterns in physical objects for vehicle detection and data processing, according to an embodiment.

FIG. 4 is a flowchart of an exemplary process for embedded patterns in physical objects for vehicle detection and data processing, according to an embodiment. Note that one or more steps, processes, and methods described herein of flowchart 400 may be omitted, performed in a different sequence, or combined as desired or appropriate.

At step 402 of flowchart 400, a pattern is captured by a vehicle device, where the pattern may be embedded on or within a physical object, such as a surface over which vehicles are operated or another surface that may be captured by a camera utilized with a vehicle. The pattern may be visible or hidden within the object, may be placed on or within the surface material of the object, and/or may be captured using an optical capture device or other imaging device (e.g., thermal, etc.). After capturing of the code, at step 404 of flowchart 400, data may be determined from the pattern, such as whether the pattern is capable of being decoded and includes encoded data that may be loaded to an application or used to fetch additional data. In other embodiments, the pattern may be required to be looked up to determine the additional data, for example, using a locally stored or remote library in a database. In some embodiments, the pattern may be decoded or looked up to determine transaction data and/or a location, service, or other application data that may be loaded to an application process. In such embodiments, steps 406 and 408 may be unnecessary in order to proceed to step 410.

However, in other embodiments, in order to determine the additional data required for processing in an application based on capturing the pattern, at step 406 of flowchart 400, contextual data for the captured pattern is determined. The contextual data may correspond to a geo-location captured by the device, input by a user including voice input or commands, or other data that may be determined by a device when capturing the pattern. Using the data and/or contextual data determined at steps 404 and/or 406, at step 408 of flowchart 400, additional data may be received based on the pattern. The additional data may correspond to transaction data that may be available from a merchant device and may be routed to the device through a service provider in response to capturing the pattern. Once the additional data is received, the data captured at step 404, 406, and/or 408 may be loaded to an application process and used for processing of the data, at step 410 of flowchart 400. This may be done without user input or minimal user input so that data processing may occur in an automated manner and minimize user interactions with the device. Based on the data loaded to the application process, at step 412 of flowchart 400, the data is processed by the application. This may include electronic transaction processing within the application using an online payment service provider. The application may utilize an account or other payment instrument stored by the device and available to the application. The application may also receive a transaction processing result or history, which may be used to transaction authorization with a merchant device (e.g., sent by the vehicle device to the merchant device using an identifier, short range wireless communications, or network communication, displayed by the vehicle device, etc.).

Figure 5:
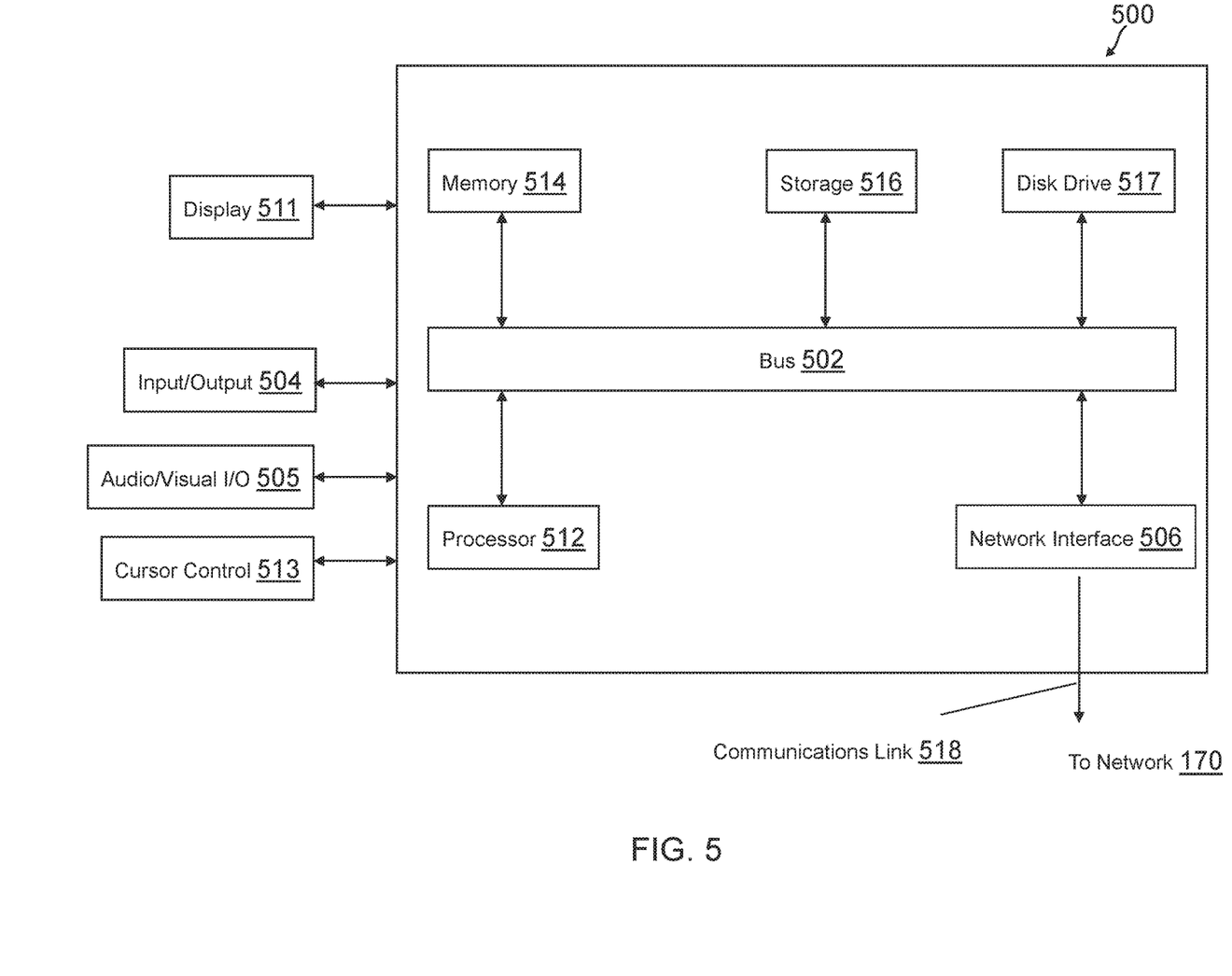
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A device comprising:
    an image capture component;
    a non-transitory memory storing instructions; and
    one or more hardware processors coupled to the non-transitory memory and configured to read the instructions from the non-transitory memory to cause the device to perform operations comprising:
        capturing, using the image capture component, a first image at a first scene during an operation of a vehicle, the first image comprising a first embedded pattern within a first physical object at the first scene;
        determining first data from the first embedded pattern;
        accessing a pattern database and determining that the first embedded pattern corresponds to first data; and
        in response to determining the first embedded pattern corresponds to the first data, launching an application process and performing a transaction utilizing the first data.

2. The device of claim 1, wherein the first image is captured in response to detecting a condition, and wherein the condition is one of a geo-location determined by the device, a wireless signal from another device, a vibration detected based on a road passed by the vehicle, or a request by a user associated with the device.

3. The device of claim 1, wherein the pattern database comprises one of a stored data library on the device or a service provider associated with the first embedded pattern.

4. The device of claim 1, wherein a service provider provides transaction processing associated with the transaction, wherein the operations further comprise:
    in response to capturing the first image, transmitting a transaction processing request for the transaction to the service provider using the application process.

5. The device of claim 1, wherein the operations further comprise:
    in response to capturing the first image, receiving transaction data for the transaction;
    capturing, using the image capture component, a second image at a second scene associated with a location of the first embedded pattern, the second image comprising a second embedded pattern within a second physical object at the second scene;
    determining second data from the second embedded pattern;
    determining that the second data indicates a checkout area at the location; and
    processing the transaction data at the checkout area using the application process.

6. The device of claim 4, wherein the operations further comprise:
> requesting processing of the transaction;
> receiving a transaction authorization history based on the processing of the transaction; and
> providing the transaction authorization history to at least one of an output component of the device or another device for authorization of the transaction.

7. The device of claim 6, wherein the transaction comprises one of a parking service fee, an order for a merchant, a toll road fee, or an entrance fee.

8. The device of claim 1, wherein the first embedded pattern in the first physical object comprises one of an optical identifier on pavement captured in the first scene, a physical identifier within the pavement, or heating detected within the pavement, and wherein the image capture component comprises at least one of a camera or an infrared imaging device.

9. The device of claim 1, wherein the first embedded pattern is a heat pattern dynamically created in the first physical object by a heating element, wherein the first embedded pattern is encrypted prior to display, and wherein prior to the determining the first data from the first embedded pattern, the operations further comprise:
> decrypting the encrypted first embedded pattern.

10. The device of claim 1, wherein the operations further comprise:
> providing the first image to a service provider, the service provider updating changes of the first embedded pattern in the first physical object over time.

11. The device of claim 1, wherein prior to the accessing the pattern database, the operations further comprise:
> determining a geo-location of the vehicle using a location detection component of the device,
> wherein the transaction is specific to the geo-location of the vehicle.

12. The device of claim 1, wherein prior to the capturing the first image, the operations further comprise:
> determining an environmental condition during the operation of the vehicle; and
> adjusting the image capture component for capture of the first image based on the environmental condition.

13. The device of claim 1, wherein the first embedded pattern comprises an embedded code within the first physical object, and wherein the determining that the first embedded pattern corresponds to the first data comprises decoding the first data from the embedded code.

14. The device of claim 1, wherein the determining that the first embedded pattern corresponds to the first data comprises requesting the first data from a service provider based on the first embedded pattern.

15. The device of claim 1, wherein the first image is captured during one of driving the vehicle or idling the vehicle, and wherein the first scene is within a first distance to the vehicle.

16. A method comprising:
> receiving a first identifier captured through a sensor associated with a vehicle, the first identifier associated with a first physical pattern at a location;
> determining the vehicle is connected to an application on a mobile device of a user within the vehicle;
> receiving, after receiving the first identifier, a second identifier captured through the sensor, the second identifier associated with a second pattern at the location;
> determining a transaction between a merchant associated with the location and the user based on at least one of the first identifier or the second identifier;
> causing to be displayed, on at least one of a display of the vehicle or a display of the mobile device, content associated with the transaction; and
> processing the transaction using the application.

17. The method of claim 16, further comprising:
> determining the transaction based on the first identifier and the location; and
> authenticating that the transaction is associated with the user.

18. The method of claim 16, further comprising:
> receiving a confirmation of the transaction from the user through the display of the vehicle or the display of the mobile device,
> wherein the processing is based on the confirmation.

19. The method of claim 16, wherein the sensor comprises one of a vibrational sensor associated with tires on the vehicle, a camera, or a heat sensor.

20. A system comprising:
> a non-transitory memory storing instructions; and
> one or more hardware processors coupled to the non-transitory memory and configured to read the instructions from the non-transitory memory to cause the system to perform operations comprising:
>> receiving a first identifier from a device associated with a vehicle, the first identifier being associated with a first physical object at a location;
>> fetching transaction data from a merchant device associated with the location;
>> associating the transaction data with the device;
>> receiving a second identifier from the device; and
>> in response to receiving the second identifier, transmitting the transaction data to the device, the second identifier being associated with a second physical object at the location.

* * * * *

UNITED STATES PATENT AND TRADEMARK OFFICE
CERTIFICATE OF CORRECTION

PATENT NO. : 10,657,343 B1
APPLICATION NO. : 16/215466
DATED : May 19, 2020
INVENTOR(S) : Todd Studnicka Page 1 of 1

It is certified that error appears in the above-identified patent and that said Letters Patent is hereby corrected as shown below:

In the Specification

In the Detailed Description:
In Column 4, Line 18, change "and/or the other-device/server may" to --and/or the other device/server may--
In Column 9, Lines 63-64, change "data capture application 12Q." to --data capture application 120.--

Signed and Sealed this
Eighth Day of December, 2020

Andrei Iancu
*Director of the United States Patent and Trademark Office*